(12) United States Patent
Kowles

(10) Patent No.: US 10,152,091 B2
(45) Date of Patent: Dec. 11, 2018

(54) FORM FACTOR COMPATIBLE LAPTOP PC RAID ARRAY

(71) Applicant: Seagate Technology LLC, Cupertino, CA (US)

(72) Inventor: Andrew Kowles, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 155 days.

(21) Appl. No.: 15/347,615

(22) Filed: Nov. 9, 2016

(65) Prior Publication Data
US 2018/0129432 A1 May 10, 2018

(51) Int. Cl.
*G06F 3/06* (2006.01)
*G06F 1/16* (2006.01)
*G11B 33/12* (2006.01)

(52) U.S. Cl.
CPC .......... *G06F 1/1658* (2013.01); *G06F 3/0689* (2013.01); *G11B 33/12* (2013.01)

(58) Field of Classification Search
CPC ............. G06F 3/0689; G06F 2212/262; G06F 3/0619; G06F 2213/0032; G06F 2213/3802; G06F 3/0626; G06F 3/0658; G06F 3/0685; G06F 1/1658; G11B 33/12
USPC .......................................................... 711/114
See application file for complete search history.

(56) References Cited

U.S. PATENT DOCUMENTS

| | | | |
|---|---|---|---|
| 5,278,730 A | 1/1994 | Kikinis | |
| 7,634,375 B1* | 12/2009 | Pakzad | G11B 25/043 324/500 |
| 7,797,488 B2 | 9/2010 | Wang | |
| 2001/0049210 A1* | 12/2001 | Pinteric | G11B 33/122 439/76.1 |
| 2007/0162692 A1* | 7/2007 | Nishimoto | G06F 1/3221 711/113 |
| 2007/0180172 A1* | 8/2007 | Schmidt | G06F 13/4027 710/105 |
| 2007/0217171 A1* | 9/2007 | Le | H05K 5/0278 361/752 |
| 2010/0049914 A1 | 2/2010 | Goodwin | |
| 2010/0159747 A1* | 6/2010 | Chang | H01R 13/6658 439/607.35 |
| 2010/0281199 A1* | 11/2010 | Fu | G06F 13/409 710/300 |
| 2014/0328562 A1* | 11/2014 | Pitwon | G02B 6/4293 385/89 |
| 2017/0011048 A1* | 1/2017 | Wideman | G06F 17/30073 |
| 2017/0024295 A1* | 1/2017 | Klughart | G06F 17/30203 |

* cited by examiner

*Primary Examiner* — Hashem Farrokh
(74) *Attorney, Agent, or Firm* — Holzer Patel Drennan

(57) ABSTRACT

The disclosed technology provides a storage device enclosure system, which includes two hard disk drives (HDDs), a form factor compatible connector, the form factor compatible connector attached to the two HDDs and configured to connect the two HDDs to an external computing system, and a controller, the controller located on the form factor compatible connector and configured to performing data mirroring of data from the external computing system via a SATA port multiplier onto the two HDDs.

20 Claims, 7 Drawing Sheets

FORM FACTOR COMPATIBLE LAPTOP PC RAID ARRAY

SUMMARY

Certain embodiments of the present disclosure include a storage device enclosure system, which includes two hard disk drives (HDDs), a form factor compatible connector, the form factor compatible connector attached to the two HDDs and configured to connect the two HDDs to an external computing system, and a controller, the controller located on the form factor compatible connector and configured to perform data mirroring and other functions from the external computing system to the two devices in the enclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims. These and various other features and advantages will be apparent from a reading of the following Detailed Description.

BRIEF DESCRIPTIONS OF THE DRAWINGS

DETAILED DESCRIPTIONS

Increasing storage capacity in disk drives has been achieved by increasing volumetric density, which has been achieved by incrementally improving head, media, and channel technology. Due to packaging requirements, outside dimensions of a hard disk drive (HDD) are predefined based on industry standard sizes (e.g., approximately 2.5" HDD or 3.5" form factors). These form factors are not easily changed, particularly for devices mounted internally to laptops, and versatility to accommodate different components and to have reliability is desirable. Additionally, HDDs have moving components and thus a lower reliability compared to other system components. In particular, in low Z-height HDDs, there is increased shock vulnerability. In a computer system that has a single point of failure, loss of a single HDD can be catastrophic.

In the disclosed technology, a storage device enclosure includes two HDDs, a form factor compatible (e.g., single standard SATA) connector attached to the two HDDs and configured to connect the two HDDs to an external computing system. The form factor compatible connector is compatible with an approximately 2.5" form factor, although it may be compatible with form factor of other sizes. The form factor compatible connector also includes a controller (e.g., a RAID controller) located inside the enclosure and configured to performing data mirroring (e.g., RAID1) of data from the external computing system onto the two HDDs. In one implementation, the data mirroring occurs via a SATA port multiplier. In the event of one HDD failure or if one HDD exhibits slow read performance, data can be retrieved from another HDD because the same data is stored on each of the HDDs due to data mirroring. As a result, the disclosed technology has more reliability than a system with one HDD with the same density of a single HDD system, and increased performance power.

Figure 1:
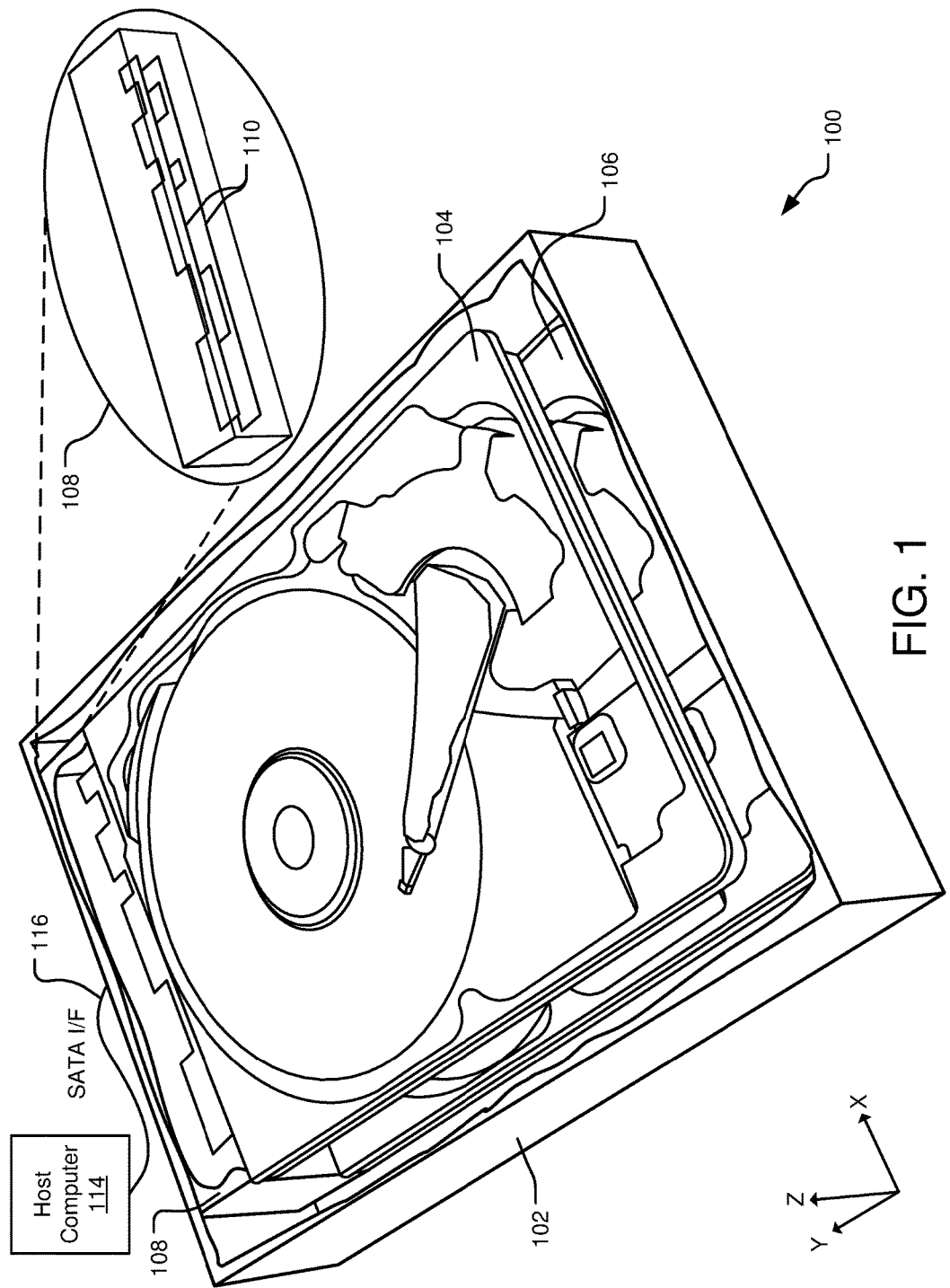
FIG. 1 illustrates a perspective view of an example storage device enclosure system, including an exploded view of a form factor compatible connector.

FIG. 1 is a perspective view of an example storage device enclosure system 100 implemented according to the disclosed technology. An enclosure 102 shown in FIG. 1 may be attached to a host computer 114 (e.g., a laptop personal computer). The enclosure 102 includes multiple storage devices (e.g., two 5 mm HDDs 104 and 106) stored or stacked in a vertical array within the enclosure 102. Each independent HDD 104 and 106 includes it own components (e.g., a printed circuit board assembly (PCBA), a dynamic random-access memory, a controller, a serial flash, a shock sensor, a bridge chip, etc.). HDDs 104 and 106 are disc drives (e.g., a standard HDD, a solid state hybrid drive (SSHD), etc.). In some implementations, HDDs 104 and 106 are both standard HDDs. In some implementations, at least one HDD is a SSHD. Other configurations and types of disc drives are contemplated.

The HDDs 104 and 106 can be mounted, attached on rails or runners, or incorporated into the enclosure 102 by another method of attachment (e.g., direct to the device PCBA). The enclosure 102 may be a mini-enclosure of various dimensions (e.g., approximately 10-15 mm) corresponding to laptop PC slots. The enclosure 102 may be made of different materials and have multiples components (e.g., a metal mount for the multiple disk drives).

A form factor compatible connector 108 is connected to the HDDs 104 and 106, and provides connectivity between the HDDs 104 and 106 and the host computer 114 via a SATA interface (I/F) 116. In one implementation, the width of the form factor compatible connector 108 may be 100 mm or less. Alternatively, the width of the form factor compatible connector 108 may be sized for certain mechanical considerations on the HDDs 104 and 106 in order to facilitate connectivity between the HDDs 104 and 106 and the host computer 114. In another implementation, the form factor compatible connector 108 may be located directly on or attached to the printed circuit board assemblies of each of the HDDs 104 and 106. Other locations for the form factor compatible connector 108 within the enclosure 102 are contemplated.

A redundant array of independent disks (RAID) controller (not shown) is located in the form factor compatible connector 108. The functionality of the RAID controller may provide a variety of RAID levels or schemes (e.g., RAID 0 striping, RAID 1 mirroring, etc.). In the event of an HDD (e.g., HDD 104) failure in a storage device enclosure system 100 or if one HDD exhibits slow read performance where a RAID controller is configured for data mirroring, data has been written identically to all the HDDs (e.g., HDDs 104 and 106) and data may be retrieved from another HDD (e.g., HDD 106) because each HDD has 100% of all the data trusted to the system. As a result, the disclosed technology has more reliability and performance than a system with one HDD, with comparable density.

The standardized form factor of devices informs the thermal and mechanical design specification of the computer, such as the dimensions, power supply type, fan location, number of external peripheral ports, etc. Thus, the form factor compatible connector 108 may be compatible with common laptop PC specifications. For example, the form factor compatible connector 108 may have one SATA connector. The two HDDs are connected to a single SATA dongle that has 2:1 connectivity. The form factor compatible connector 108 may have a SATA port multiplier 110, used for 2:1 connectivity with the point to point SATA. In one implementation, neither of the two HDDs 104 and 106 has an individual SATA dongle.

Figure 2A:
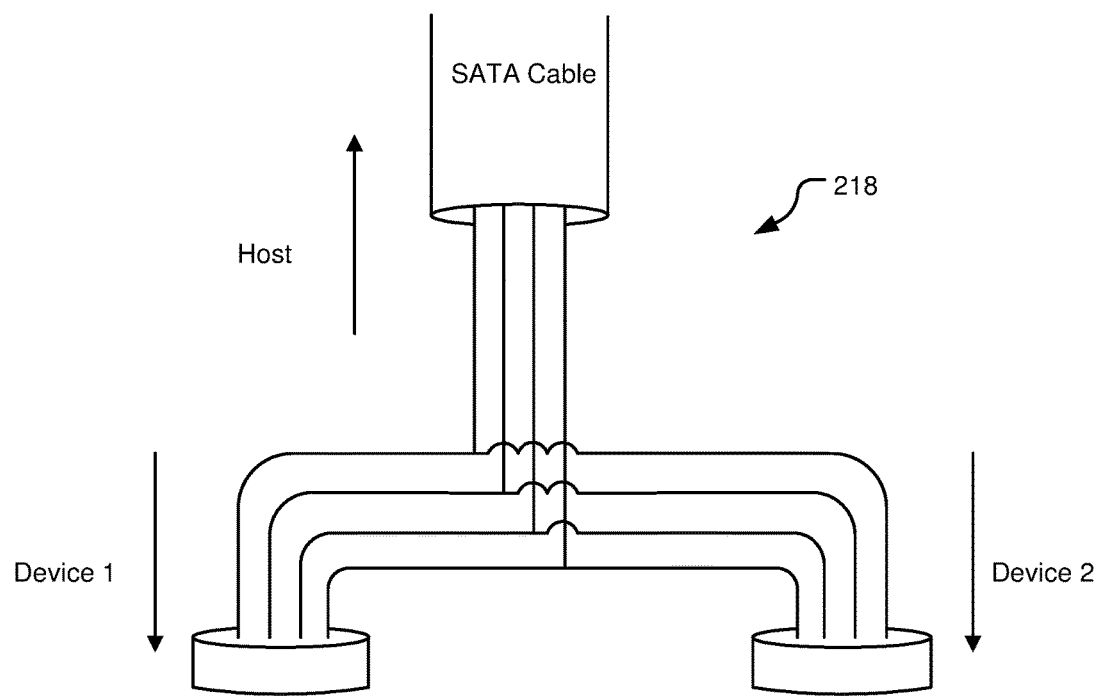
FIG. 2A illustrates a block diagram of an example storage device enclosure system.

FIG. 2A is a block diagram of an example storage device enclosure system 200. A host PC motherboard and SATA controller 202 is connected via a cable (SATA I/F 216) into a mini-enclosure 204. A controller module 206 is located in the mini-enclosure 204. In one implementation, the controller module 206 may be located in a header area in the mini-enclosure (not shown). In other implementations, the controller module 206 may be located in other areas (e.g., on a PCBA in one of the storage devices).

The controller module 206 includes a RAID controller 208 and a SATA port multiplier 210. The SATA port multiplier allows multiple devices to be connected to a single SATA host port.

The host PC motherboard and SATA controller 202 communicate directly with the RAID controller 208. The RAID controller 208 can be configured for a standard scheme or level (e.g., data mirroring (RAID1), striping, parity, etc.). In FIG. 2A, the RAID controller 208 is configured for data mirroring.

The RAID controller 208 is connected to the SATA port multiplier 210. The SATA Port Multiplier 210 facilitates communication between the RAID controller 208 and one or more storage devices (e.g., Storage Device A 212 and Storage Device B 214).

The Storage Device A 212 and Storage Device B 214 may be 5 mm storage devices, and other sizes are contemplated. The Storage Device A 212 and Storage Device B 214 may be hybrid or non-hybrid storage devices (e.g., Storage Device A can be a SSHD and Storage Device B can be a HDD).

In FIG. 2A, a data mirroring RAID functionality in the RAID controller 208 replicates data in real time. In the event of one disk drive failure or if one HDD exhibits slow read performance (e.g., Storage Device A), the system 200 can retrieve data from another HDD because the same data is stored on multiple storage devices (e.g., Storage Device B). Thus, the storage device enclosure system 200 has increased reliability compared to single HDD systems.

Figure 2B:
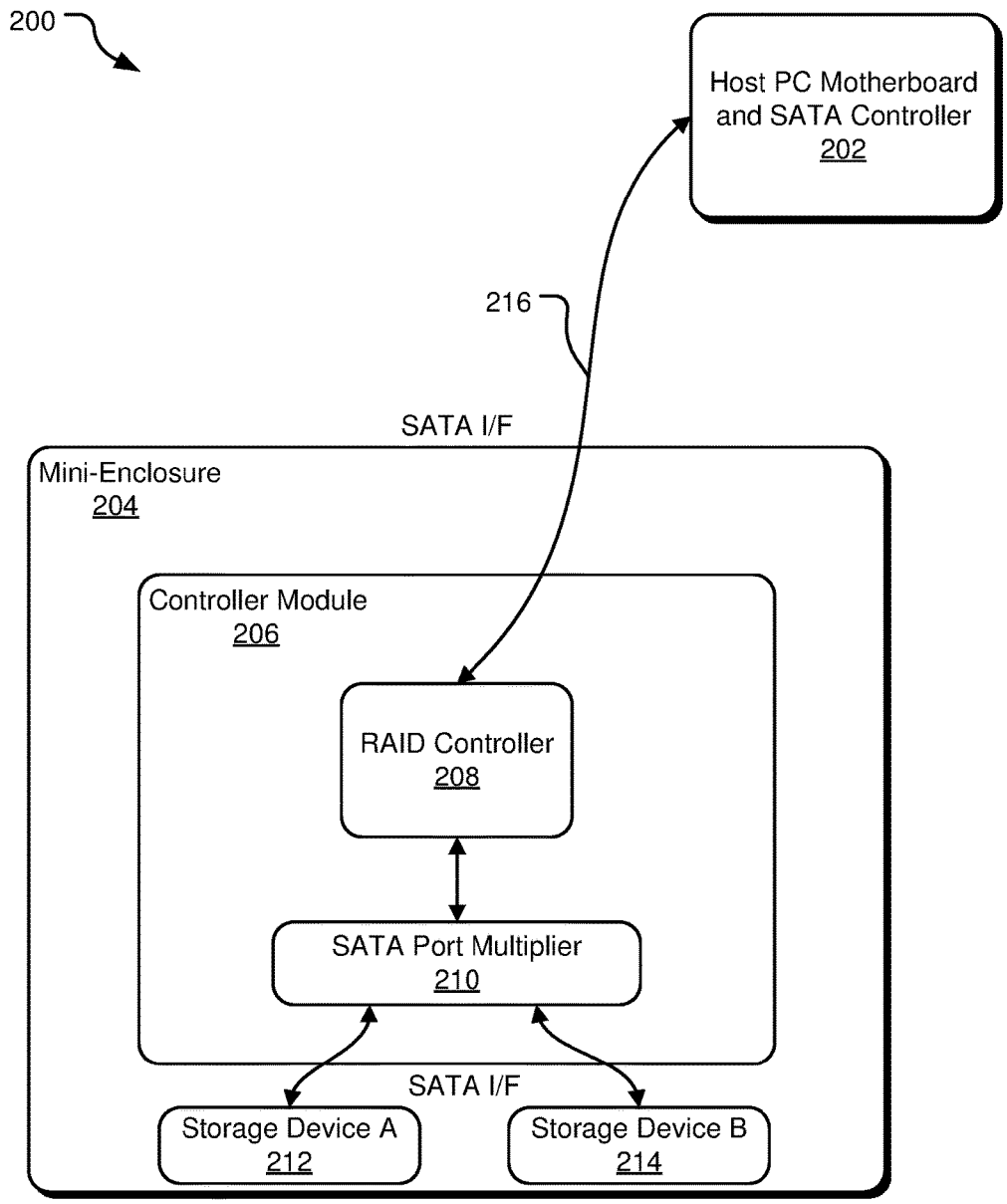
FIG. 2B is a schematic diagram of an example form factor compatible connector.

FIG. 2B is a schematic diagram of an example form factor compatible connector (e.g., SATA connector 218). The SATA connector 218 is connected to two devices (e.g., Device 1 and Device 2), and provides connectivity between the device and a host computer via a cable (or SATA interface). In one implementation, the width of the form factor compatible connector may be 100 mm or less. Alternatively, the width of the form factor compatible connector may be sized for certain mechanical considerations on the devices in order to facilitate connectivity between the devices and the host computer. In another implementation, the SATA connector may be located directly on or attached to the printed circuit board assemblies of each of the devices. Other locations for the SATA connector within an enclosure are contemplated.

Figure 3:
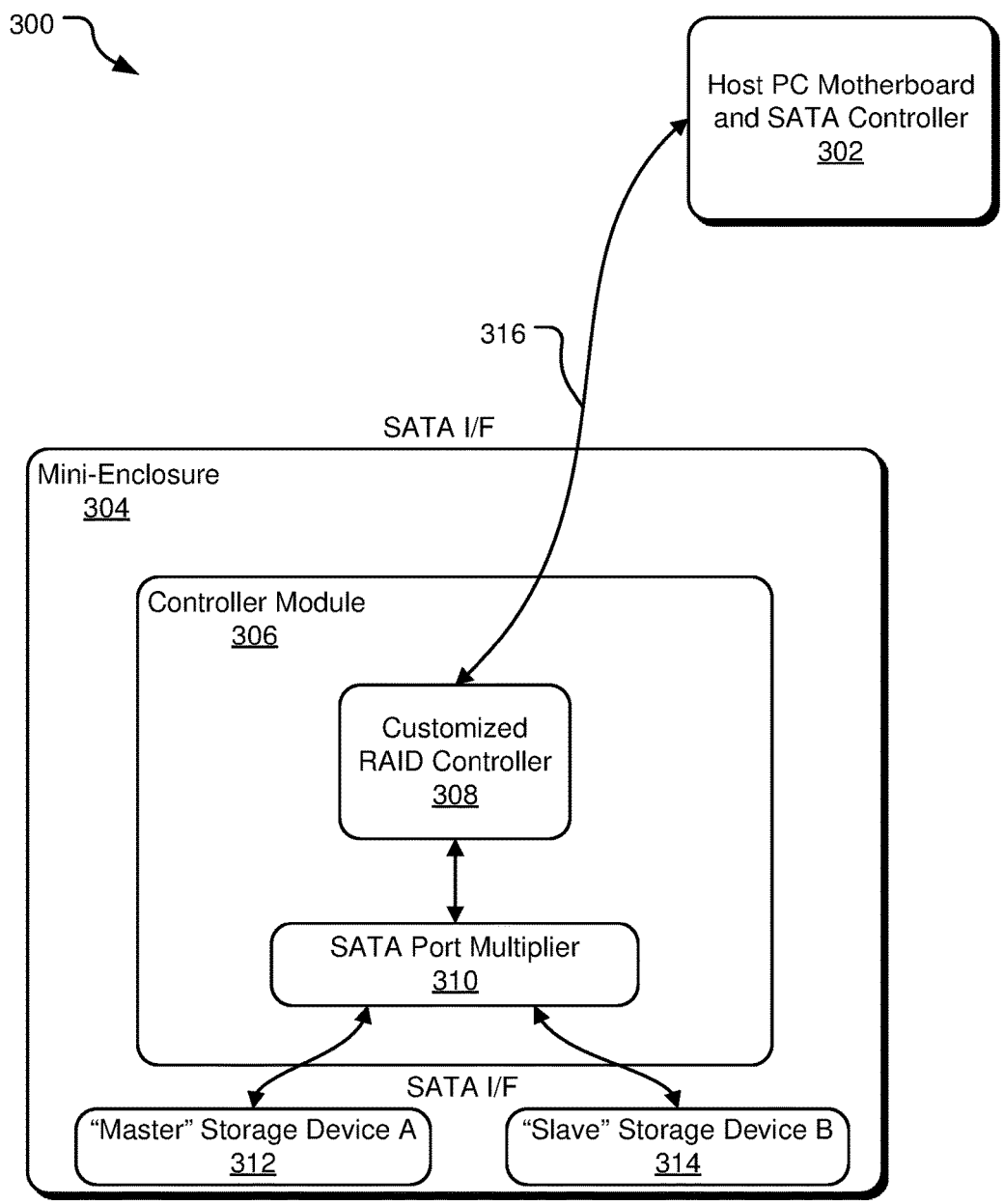
FIG. 3 illustrates a block diagram of another example storage device enclosure system.

FIG. 3 is a block diagram of an example storage device enclosure system 300. A host PC motherboard and SATA controller 302 is connected via a cable (SATA I/F 316) into a mini-enclosure 304. A controller module 306 is located in the mini-enclosure 304. In one implementation, the controller module 306 may be located in a header area in the mini-enclosure (not shown). In other implementations, the controller module 306 may be located in other areas (e.g., on a PCBA in one of the storage devices).

The controller module 306 includes a customized RAID controller 308 and a SATA port multiplier 310. The host PC motherboard and SATA controller 302 communicates directly with the customized RAID controller 308.

The RAID controller 308 is connected to the SATA port multiplier 310. The SATA port multiplier 310 facilitates communication between the customized RAID controller 308 and one or more storage devices (e.g., Storage Device A and Storage Device B).

In this implementation, the customized RAID controller 308 can be customized for a standard scheme or level specific to each storage device. In FIG. 3, the storage devices include a Storage Device A 312 or the "Master," which is a SSHD, and a Storage Device B 314 or the "Slave," which is a HDD.

A microprocessor (not shown) on the customized RAID controller 308 controls staggered spin-up operations of the Storage Device A 312 and the Storage Device B 314. A spin-up operation is when the motor controller is maintaining the specified spin speed. The heads may or may not be flying over the media. The radial positioning system may or may not be keeping position. Depending on the power state, a spinning drive may not be ready to perform data operations, such as read or write. A staggered spin-up operation refers to a process where one HDD starts at a time, or the time period for a first HDD in a multiple HDD system to accelerate its disk from a stopped state to an operational speed. After a predefined time period, a second drive can begin a spin-up operation. The staggered spin-up operation caps the peak power consumption by the devices in the storage device enclosure system 300 by only spinning up one device at a time. The staggered spin-up operation is significant for plug and play compatibility between the storage device enclosure system 300 and host system electronics.

A spin-down operation refers to a controlled transition into a lower power state. In addition to mechanically stopping the spindle and necessarily parking the recording heads in a safe place, certain other circuits and components will be powered down, leaving basic functions remaining. In some implementation, the customized RAID controller performs spin-down operations, in the form of standby immediate and idle intermediate commands, on at least one of the two HDDs based on a determination that the host has entered a lower power state. Then, the customized RAID controller can perform striping read operations on data from the external computing system via the port multiplier to the two HDDs reading approximately half the data from each HDD in parallel for better performance.

The hardware in the storage device enclosure system 300 in FIG. 3 is substantially the same as the hardware in the storage device enclosure system 200 in FIG. 2. However, the customized RAID controller 308 in FIG. 3 performs different functions for each of the storage devices 312 and 314. For example, on a read request, the RAID Controller 308 may will ask Storage Device A 312 (the "Master") first if the Storage Device A 312 has data in its read cache. If Storage Device A 312 does have the requested data in its read cache, then only Storage Device A 312 performs a spin-up operation and Storage Device B 314 does not need to perform a spin-up operation. If Storage Device A 312 is not responsive (e.g., the drive failed), Storage Device B 314 can perform a spin-up operation and provide the data.

In an enclosure with two HDDs, there can be increased power consumption. When an HDD initiates a spin-up operation, the maximum power or current is taken from the HDD. In the implementation in FIG. 3, during a spin-up operation of a host computer, data is obtained from the "Master," which is spinning, and the "Slave" is not spinning. Thus, the power use by the two storage devices is staggered, there is power conservation and lower heat generation, and power surges from all of the HDDs performing spin-up operations is avoided.

In FIG. 3, due to the RAID functionality of the controller, specifically data mirroring which replicates logical disk volumes in real time, in the event of one disk drive failure or if one drive exhibits low performance (e.g., Storage Device A 312), the system 300 can retrieve data from the other disk drive (e.g., Storage Device B 314). Thus, the storage device enclosure system 300 has more reliability than a system with one HDD with the same density of a single HDD system, and increased performance power.

Figure 4:
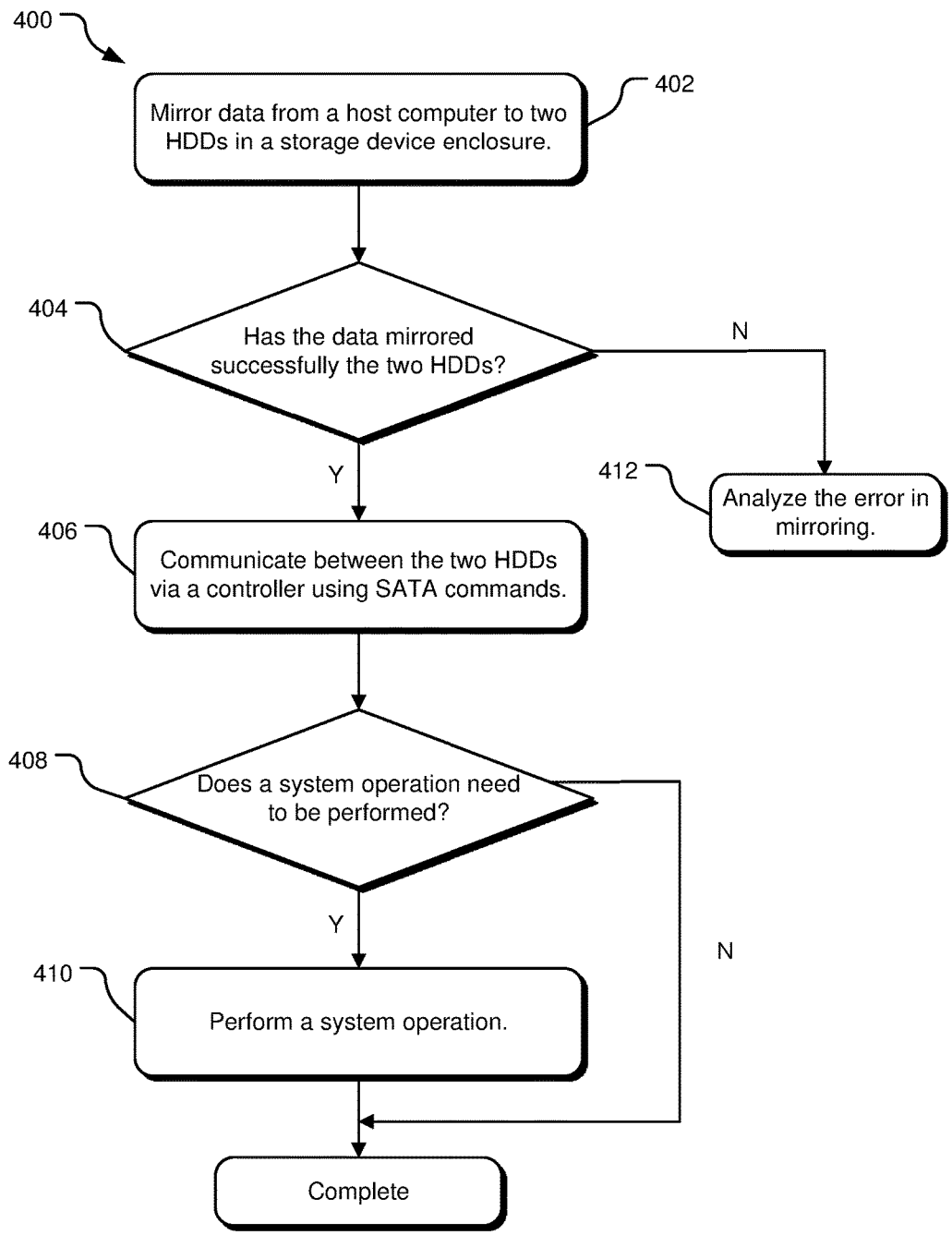
FIG. 4 illustrates a flowchart of example operations in a storage device enclosure system.

FIG. 4 is a flowchart of example operations 400 in an example storage device enclosure system. A mirroring operation 402 performs data mirroring write operations to two HDDs in the disclosed storage device enclosure system. Data mirroring write operations include replicating data from an external personal computer onto two HDDs via a form factor compatible connector located in the storage device enclosure system and attached to the two HDDs. The data mirroring operation 402 ensures continuous data availability in the event of a data loss or corruption on one of the HDDs. The existence of two HDDs in the storage device enclosure system provides a back-up and double security.

In a determining operation 404, the two HDDs can determine whether the data mirroring operation 402 was successful. If the determining operation 404 determines that the data mirroring operation 402 was not successful, an analyzing operation 412 analyzes error(s) in the data mirroring.

If the determining operation 404 determines that the data mirroring operation 402 was successful, then a communicating operation 406 occurs where the two HDDs communicate with each other via a customized RAID controller using SATA commands. For example, the two HDDs can communicate regarding certain system conditions, such as a HDD failure or a power down sequence. There can be a variety of system conditions. The conditions provided in this disclosure are by way of example. The communicating operation 406 can occur before or after other operations in operation 400. The communicating operation 406 can also occur simultaneously as other operations occur during operations 400.

In a determining operation 408, after the two HDDs have communicated, it can be determined whether or not a system operation needs to be performed. For example, if the HDDs communicated with each other and identified a system condition requiring a data retrieval operation or power on sequence, then such system operation can be performed in a performing operation 410. If the determining operation 408 determines a system operation does not need to be performed, then operations 400 are complete.

Figure 5:
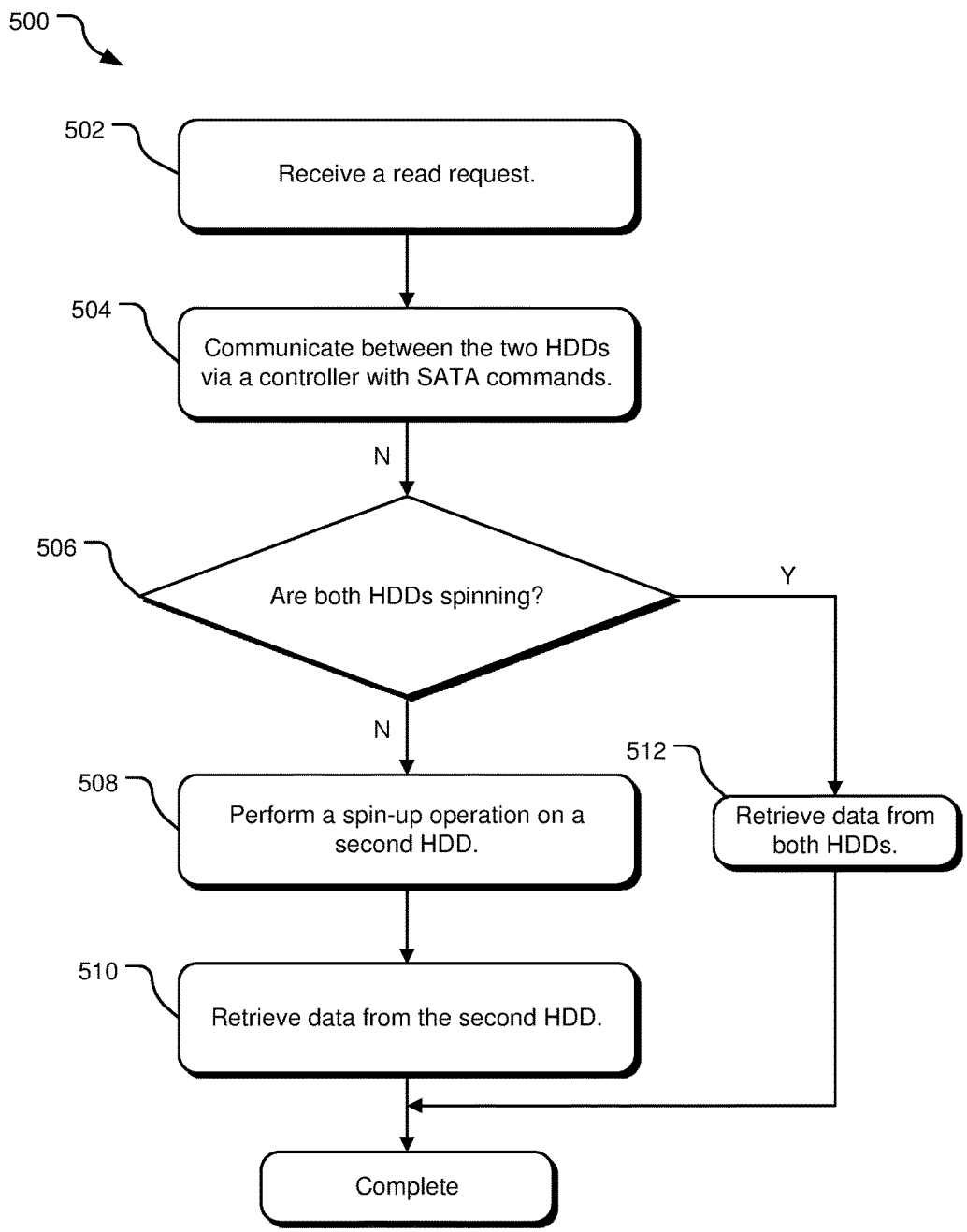
FIG. 5 illustrates a flowchart of example operations in a storage device enclosure system.

FIG. 5 illustrates a flowchart of example operations 500 in a storage device enclosure system. An operation 502 receives a read request. A communicating operation 504 occurs where the two HDDs communicate with each other via a customized RAID controller using SATA commands.

In a determining operation 506, it can be determined as to whether both HDDs are spinning, whether one drive exhibits low performance or whether an HDD has crashed or failed, and which HDD has failed. If both HDDs are spinning, then data can be retrieved in a retrieving operation 512. For example, the controller may perform striping read operations on data from the external computing system via the port multiplier to the two spun up HDDs, reading approximately half the data from each for better performance. After the data is retrieved, then operations 500 are complete.

If the determining operation 506 determines that, for example, a first drive (e.g., a Storage Device A, a "Master" drive or a SSHD) is unresponsive to a request for data in the determining operation 406 (e.g., Device A has failed), then a performing operation 508 initiates a spin operation on a second drive (e.g., a Storage Device B, a "Slave" drive or a HDD drive). For example, the controller may steer data read operations. In some implementations, the controller may steer data read operations for better performance.

In a retrieving operation 510, data can be retrieved from Storage Device B because Storage Device B has the same data as Storage Device, as facilitated by the data mirrored to each HDD during a mirroring operation. Once data is retrieved from the second drive, operations 500 are complete.

Figure 6:
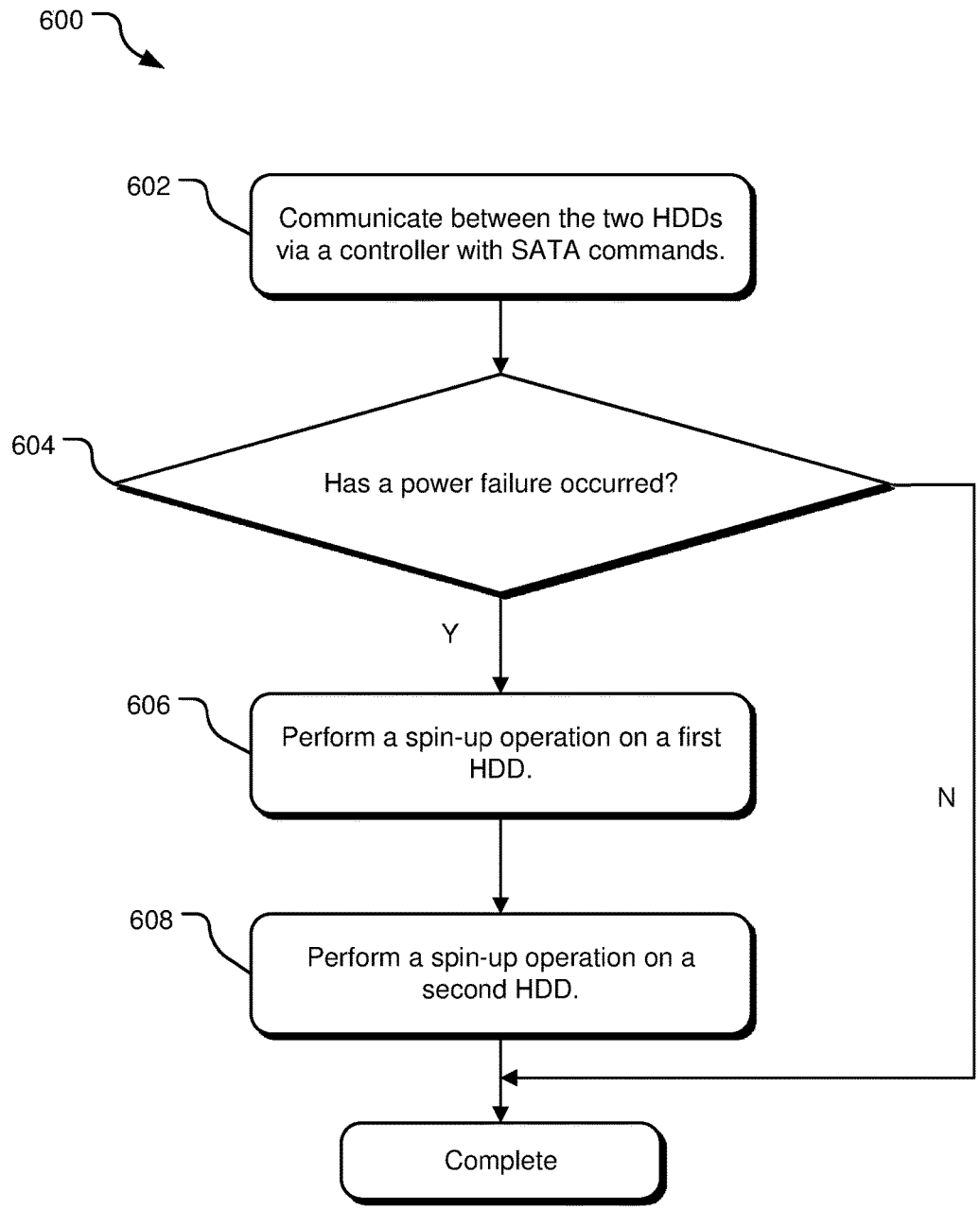
FIG. 6 illustrates a flowchart of example operations in a storage device enclosure system.

FIG. 6 illustrates a flowchart of example operations 600 in a storage device enclosure system. In a storage device enclosure system where it has been determined that data mirroring operations were performed successfully, a communicating operation 602 occurs where the two HDDs communicate with each other via a customized RAID controller using SATA commands.

In a determining operation 604, a system condition can be determined as to whether a power off (or loss of power) has occurred. If the determining operation 604 determines that there is a power loss and the system requires a power-on sequence (or power on reset) of an external personal computer, then a staggered spin-up operation (operations 606 and 608) can occur. A performing operation 606 initiates a spin-up operation on the Storage Device A. A performing operation 608 initiates a spin-up operation on the Storage Device B after initiating the spin-up operation on Storage Device A. Thus, the power use by the two storage devices is staggered, capping the maximum current draw by the array in order to provide plug and play power budget compatibility with existing single HDD mobile motherboards.

If the determining operation 604 determines that there was no power loss and the system does not require a power-on sequence (or power on reset) of an external personal computer, then the operations 600 are complete.

As the demand for data storage continues, requirements for capacity and areal density increase commensurately. Increased areal density can mean the power consumption of a data storage system increases while reliability decreases. The use of the disclosed system enables more than one disk drive to be housed within each enclosure with backwards compatibility.

The logical operations making up the embodiments of the invention described herein are referred to variously as operations, steps, objects, or modules. Furthermore, it should be understood that logical operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A storage device enclosure system comprising:
   two hard disk drives (HDDs);
   a form factor compatible connector, the form factor compatible connector attached to the two HDDs and configured to connect the two HDDs to an external computing system; and
   a controller, the controller located on the form factor compatible connector and configured to perform redundant array of independent disks (RAID) functions on data from the external computing system via a SATA port multiplier onto the two HDDs.

2. The storage device enclosure system of claim 1, wherein the form factor compatible connector is compatible with an approximately 2.5" form factor.

3. The storage device enclosure system of claim 1, wherein the storage device enclosure system is configured for an approximately 10-15 mm personal computer slot.

4. The storage device enclosure system of claim 1, wherein the two HDDs communicate with each other via the customized RAID controller using SATA commands.

5. The storage device enclosure system of claim 1, wherein at least one of the two HDDs is a solid state hybrid drive.

6. The storage device enclosure system of claim 1, furthering comprising a shared dongle on the form factor compatible connector to connect the two HDDs to the external computing system.

7. A storage device enclosure system comprising:
   two hard disk drives (HDDs), wherein at least one of the two HDDs is a solid state hybrid drive;
   a form factor compatible connector, the form factor compatible connector attached to the two HDDs and configured to connect the two HDDs to an external computing system; and
   a customized controller, the customized controller located on the form factor compatible connector and configured to selectively perform operations on one or both of the two HDDs via a SATA port multiplier.

8. The storage device enclosure system of claim 7, customized redundant array of independent disks (RAID) controller configured to perform data mirroring write operations on data from the external computing system via the SATA multiplier to the two HDDs.

9. The storage device enclosure system of claim 8, wherein the two HDDs communicate with each other via the customized RAID controller using SATA commands.

10. The storage device enclosure system of claim 9, wherein the customized RAID controller is further configured to perform staggered spin-up operations based on a determination that the external computing system is performing a power-on sequence.

11. The storage device enclosure system of claim 10, wherein the customized RAID controller is further configured to perform spin-down operations on at least one of the two HDDs based on a determination that the external computing system has entered a lower power state.

12. The storage device enclosure system of claim 11, wherein the customized RAID controller is further configured to perform striping read operations on data from the external computing system via the port multiplier to the two HDDs reading approximately half the data from each HDD in parallel for better performance.

13. A method comprising:
    mirroring data from an external host computer to two hard disk drives (HDDs) in a storage device enclosure via a form factor compatible connector attached to the two HDDs, the form factor compatible connector including a controller and a SATA port multiplier and configured to facilitate communication via SATA commands between the two HDDs.

14. The method of claim 13, further comprising selectively performing operations on one of the two HDDs with a customized redundant array of independent disks (RAID) controller.

15. The method of claim 14, further comprising retrieving data from one of the HDDs if the other HDD exhibits slow read performance.

16. The method of claim 14, further comprising retrieving data from one of the HDDs if the other HDD fails.

17. The method of claim 16, further comprising performing a staggered spin operation with the customized RAID controller during data retrieval.

18. The method of claim 17, wherein at least one of the HDDs is a solid state hybrid drive.

19. The method of claim 18, further comprising steering data read operations to the solid state hybrid drive.

20. The method of claim 19, further comprising steering data read operations to the solid state hybrid drive for better performance.

* * * * *